US012776833B2

(12) United States Patent
Kojima et al.

(10) Patent No.: US 12,776,833 B2
(45) Date of Patent: Oct. 27, 2026

(54) COMMUNICATION APPARATUS, COMMUNICATION SYSTEM, COMMUNICATION METHOD AND PROGRAM

(71) Applicant: NTT, Inc., Tokyo (JP)

(72) Inventors: Yasuyoshi Kojima, Musashino (JP); Daisuke Goto, Musashino (JP); Kiyohiko Itokawa, Musashino (JP); Kazumitsu Sakamoto, Musashino (JP); Tomoya Kageyama, Musashino (JP)

(73) Assignee: NTT, Inc., Tokyo (JP)

( * ) Notice: Subject to any disclaimer, the term of this patent is extended or adjusted under 35 U.S.C. 154(b) by 275 days.

(21) Appl. No.: 18/728,940

(22) PCT Filed: Jan. 19, 2022

(86) PCT No.: PCT/JP2022/001753

§ 371 (c)(1),
(2) Date: Jul. 15, 2024

(87) PCT Pub. No.: WO2023/139677

PCT Pub. Date: Jul. 27, 2023

(65) Prior Publication Data

US 2025/0105916 A1 Mar. 27, 2025

(51) Int. Cl.
*H04B 7/195* (2006.01)

(52) U.S. Cl.
CPC .................................... *H04B 7/195* (2013.01)

(58) Field of Classification Search
CPC ...................................................... H04B 7/195
See application file for complete search history.

(56) References Cited

FOREIGN PATENT DOCUMENTS

WO WO-2021234872 A1 * 11/2021 ......... H04B 7/18519

OTHER PUBLICATIONS

Wei Feng et al., "UAV-aided MIMO communications for 5G Internet of Things", IEEE Internet of Things Journal, vol. 6, No. 2, 2019, p. 1731-1740.

* cited by examiner

*Primary Examiner* — Angela Widhalm De Rodriguez

(57) ABSTRACT

An acquisition unit acquires environment information indicating an installation environment of a communication apparatus. A scheme specifying unit specifies a transmission scheme of data on the basis of relational data indicating a relationship between the environment information and the transmission scheme and the acquired environment information. A transmission unit transmits the data to a relay device on the basis of the specified transmission scheme.

6 Claims, 6 Drawing Sheets

COMMUNICATION APPARATUS, COMMUNICATION SYSTEM, COMMUNICATION METHOD AND PROGRAM

CROSS-REFERENCE TO RELATED APPLICATIONS

This application is a 371 U.S. National Phase of International Application No. PCT/JP2022/001753, filed on Jan. 19, 2022. The entire disclosure of the above application is incorporated herein by reference.

TECHNICAL FIELD

The present invention relates to a communication apparatus, a communication system, a communication method, and a program.

BACKGROUND ART

With the development of Internet of Things (IoT) technology, it has been studied to install IoT terminals including various sensors in various places. For example, it is also assumed that the IoT is used to collect data of a place where it is difficult to install a base station, such as a buoy or a ship on the sea or a mountainous area. Meanwhile, there is a technology of wirelessly communicating with a communication apparatus on the ground by using an unmanned aerial vehicle (UAV) or a geostationary satellite (see, for example, Non Patent Literature 1).

CITATION LIST

Non Patent Literature

Non Patent Literature 1: Wei Feng, et al. "UAV-aided MIMO communications for 5G Internet of Things", IEEE Internet of Things Journal, Volume 6, Issue 2, 2019, p. 1731-1740

SUMMARY OF INVENTION

Technical Problem

The channel capacity of a relay device and a communication apparatus changes depending on the environment in which the communication apparatus is installed. For example, in a case where communication apparatuses are provided in an urban area, since there are many competing communication apparatuses, there is a possibility that the channel capacity decreases due to signal collision. In addition, for example, in a case where the communication apparatus is provided in a mountain area, the channel capacity may be reduced because the viewing angle is narrow due to an obstacle such as a forest.

In view of the above circumstances, an object of the present invention is to provide a communication apparatus, a communication system, a communication method, and a program capable of improving communication efficiency according to an environment in which the communication apparatus is installed.

Solution to Problem

A first aspect of the present invention is a communication apparatus that transmits data to a relay device that performs communication while moving, the communication apparatus including: an acquisition unit (hereinafter also referred to as "acquirer") that acquires environment information indicating an installation environment of the communication apparatus; a scheme specifying unit (hereinafter also referred to as "scheme specifier") that specifies a transmission scheme of the data on the basis of relational data indicating a relationship between the environment information and the transmission scheme and the acquired environment information; and a transmission unit (hereinafter also referred to as "transmitter") that transmits the data to the relay device on the basis of the specified transmission scheme.

A second aspect of the present invention is a communication system, including: a relay device that performs communication while moving; and a plurality of communication apparatuses according to the above aspect, in which the environment information of at least one of the plurality of communication apparatuses is different from the environment information of another communication apparatus.

A third aspect of the present invention is a communication method of a communication apparatus that transmits data to a relay device that performs communication while moving, the communication method including: a step of acquiring environment information indicating an installation environment of the communication apparatus; a step of specifying a transmission scheme of the data on the basis of relational data indicating a relationship between the environment information and the transmission scheme and the acquired environment information; and a step of transmitting the data to the relay device on the basis of the specified transmission scheme.

Advantageous Effects of Invention

According to the at least one aspect described above, communication efficiency can be improved according to the environment in which the communication apparatus is installed.

DESCRIPTION OF EMBODIMENTS

Hereinafter, embodiments of the present invention will be described in detail with reference to the drawings.

First Embodiment

Figure 1:
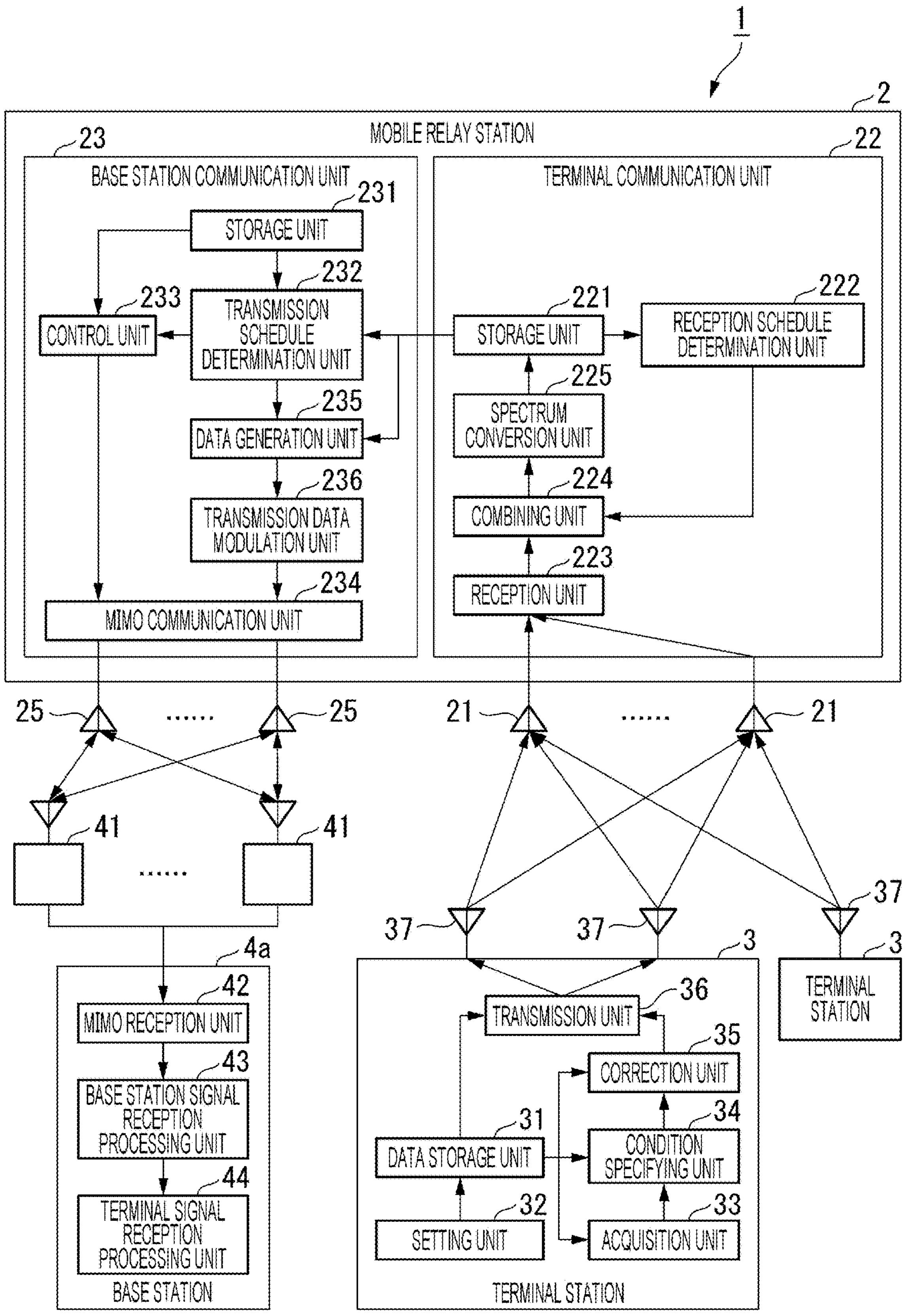
FIG. 1 is a configuration diagram of a wireless communication system according to a first embodiment.

FIG. 1 is a configuration diagram of a wireless communication system 1 according to the first embodiment. The wireless communication system 1 includes a mobile relay station 2, a terminal station 3, and a base station 4. The numbers of mobile relay stations 2, terminal stations 3, and base stations 4 included in the wireless communication system 1 each are arbitrary, but it is assumed that there is a large number of terminal stations 3. That is, the terminal stations 3 are installed in different environments.

The mobile relay station 2 is an example of a relay device that performs communication while moving. The mobile relay station 2 is provided in, for example, a low earth orbit (LEO) satellite. The LEO satellite has an altitude of 2000 km or less and moves around the earth once every about 1.5 hours. The terminal station 3 and the base station 4 are installed on the earth such as on the ground or on the sea. The terminal station 3 is, for example, an IoT terminal. The terminal station 3 collects data such as environmental data detected by a sensor and wirelessly transmits the collected data to the mobile relay station 2. In the drawing, only two terminal stations 3 are illustrated. The mobile relay station 2 receives the data transmitted from each of the plurality of terminal stations 3 via radio signals while moving above the earth and wirelessly transmits the received data to the base station 4. The base station 4 receives the data collected by the terminal station 3 from the mobile relay station 2.

As the mobile relay station 2, it is conceivable to use a relay station mounted on a geostationary satellite or an unmanned aerial vehicle such as a drone, or a high altitude platform station (HAPS). However, a relay station mounted on a geostationary satellite has a wide coverage area (footprint) on the ground, but has a very small link budget with respect to IoT terminals installed on the ground because its altitude is high. On the other hand, in the case of a relay station mounted on a drone or a HAPS, the link budget is high, but the coverage area is small. Furthermore, the drone requires a battery, and the HAPS requires a solar panel. In the present embodiment, the mobile relay station 2 is mounted on the LEO satellite. Thus, the link budget falls within a limit, and, in addition, the LEO satellite has no air resistance and has low fuel consumption because the LEO satellite moves around the outside of the atmosphere. In addition, the footprint is larger than that in the case of the relay station mounted on the drone or the HAPS.

However, the mobile relay station 2 mounted on the LEO satellite performs communication while moving at a high speed, and thus a Doppler shift occurs in radio signals. In addition, the relay station mounted on the LEO satellite has a smaller link budget than a case where a relay station is mounted on a drone or a HAPS. Therefore, the mobile relay station 2 receives radio signals from the terminal stations 3 through a plurality of antennas and transmits the radio signals to the base station 4 through a plurality of antennas. Communication quality can be improved by a diversity effect and beamforming effect of communication using the plurality of antennas. In the present embodiment, there will be described an example where the mobile relay station 2 relays radio signals received from the terminal stations 3 through the plurality of antennas to the base station 4 by multiple input multiple output (MIMO). Note that a method of relaying to the base station 4 may be other than MIMO.

A configuration of each device will be described.

The mobile relay station 2 includes a plurality of first antennas 21, a terminal communication unit 22, a base station communication unit 23, and a plurality of second antennas 24. The first antenna 21 is used for communication with the terminal station 3. The second antenna 24 is used for communication with the base station 4. The terminal communication unit 22 includes a storage unit 221, a reception schedule determination unit 222, a reception unit 223, a combining unit 224, and a spectrum conversion unit 225.

The storage unit 221 stores position data of the terminal station 3 and orbit data of the LEO satellite. The position data of the terminal station 3 is indicated by, for example, latitude and longitude. The orbit data of the LEO is data from which a position, speed, moving direction, and the like of the LEO satellite at an arbitrary time can be obtained. The storage unit 221 has a storage area for storing spectral data of a terminal uplink signal received from the terminal station 3.

The reception schedule determination unit 222 specifies a timing at which a signal is received from each terminal station 3 on the basis of the position data of the terminal station 3 and the orbit data stored in the storage unit 221. The reception unit 223 receives a signal via the plurality of first antennas 21. The combining unit 224 combines a plurality of signals received by the reception unit 223 via the plurality of first antennas 21 according to a predetermined combination parameter. The combination parameter is indicated by, for example, an offset of a phase and amplitude of each first antenna 21. Note that the combination parameter may be obtained on the basis of the signal reception timing and the positional relationship between the mobile relay station 2 and the communication counterpart terminal station 3 at the reception timing, or may be a constant value at all times. The combining unit 224 reproduces a terminal uplink signal by combining the signals.

The spectrum conversion unit 225 converts the signal combined by the combining unit 224 into a frequency spectrum. The spectrum conversion unit 225 obtains a frequency spectrum of the received signal by fast Fourier transform (FFT), for example. The spectrum conversion unit 225 records spectral data indicating the generated frequency spectrum in the storage unit 221. The spectral data is indicated by a combination of a frequency and power of the frequency.

The base station communication unit 23 transmits spectral data indicating a waveform of the terminal uplink signal received by the terminal communication unit 22 to the base station 4 by MIMO. The base station communication unit 23 includes a storage unit 231, a transmission schedule determination unit 232, a control unit 233, a MIMO communication unit 234, a data generation unit 235, and a transmission data modulation unit 236.

The storage unit 231 stores a communication time zone with the base station 4 obtained in advance from a position of the base station 4 and an orbit of the LEO satellite. In addition, the storage unit 231 stores in advance a weight of a base station downlink signal transmitted from each second antenna 24 for each transmission time in the communication time zone. The transmission time may be indicated by, for example, a time elapsed from a transmission start timing. The weight for each transmission time is calculated on the basis of the orbit data of the LEO satellite and the position of each antenna station 41.

The transmission schedule determination unit 232 determines a transmission time zone for each spectral data on the basis of the number of pieces of the spectral data stored in the storage unit 221 and the communication time zone. For example, the transmission schedule determination unit 232 determines a transmission time of each piece of the spectral data by dividing the length of the communication time zone by the number of pieces of the spectral data and determines the transmission time zone of each piece of the spectral data by separating the communication time zone by the transmission time.

The control unit 233 issues an instruction on the weight for each transmission time read from the storage unit 231 to the MIMO communication unit 234. The MIMO communication unit 234 establishes MIMO communication with the base station 4 according to a predetermined protocol.

The data generation unit 235 converts the spectral data stored in the storage unit 221 into a parallel signal. The transmission data modulation unit 236 modulates the spectral data converted into the parallel signal. The modulated parallel signal is weighted with the weight instructed from the control unit 233 and is transmitted from each second antenna 24 as a base station downlink signal.

The terminal station 3 includes a data storage unit 31, a setting unit 32, an acquisition unit 33, a condition specifying unit 34, a correction unit (hereinafter also referred to as "corrector") 35, a transmission unit 36, and one or a plurality of antennas 37. The terminal station 3 is an example of a communication apparatus that transmits data to the relay device. The data storage unit 31 stores sensor data, environment information, relational data, and the orbit data of the LEO satellite. The environment information is information indicating an installation environment of the terminal station 3 set from the outside. The environment information has values of, for example, a mountain area, the sea, a rural area, an urban area, and the like. The relational data indicates a relationship between the environment information and the transmission scheme. For example, the relational data is a table in which each value of the environment information is associated with the transmission scheme. The transmission method is indicated by a multi-value number, the number of bits of an error correction code, and transmission power. Note that, in other embodiments, an error detection code may be used instead of the error correction code.

In the relational data, an environment with a relatively small channel capacity is associated with a transmission scheme with higher transmission quality, and an environment with a relatively large channel capacity is associated with a transmission scheme with higher transmission efficiency. For example, since the viewing angle is narrow due to the presence of trees and the like in a mountain area, there is a high possibility that the channel capacity becomes small compared to that on the sea with few obstacles. In addition, for example, in an urban area, since the existence density of communication apparatuses in the area is high, there is a high possibility that the channel capacity becomes small as compared with that in a rural area in which the existence density of communication apparatuses is low.

Specifically, in the relational data, a transmission scheme having a small multi-value number is associated with an environment with a small channel capacity. The larger the multi-value number, the larger the amount of information per symbol, and the higher the transmission efficiency. On the other hand, the smaller the multi-value number, the lower a symbol error rate and the higher the transmission quality. In addition, in the relational data, a transmission scheme having a large number of bits of the error correction code is associated with an environment with a small channel capacity. The shorter the error correction code, the larger the information amount of the payload with respect to a data frame, and the higher the transmission efficiency. On the other hand, the longer the error correction code, the larger the number of bits in which the error can be corrected, and the higher the transmission quality. Note that in a case where the error detection code is used, the transmission scheme in which the number of bits of the error detection code is large is associated with the environment with a small channel capacity in the relational data. The shorter the error detection code, the larger the information amount of the payload with respect to a data frame, and the higher the transmission efficiency.

In addition, in the relational data, a large transmission power is associated with an environment with a large amount of noise. For example, since there are more communication equipment used on the ground in the urban area than in the rural area, the SN ratio is relatively high. Thus, the probability of occurrence of an error can be reduced by increasing the transmission power and reducing the SN ratio.

The setting unit 32 receives setting of environment information and relational data from the outside. For example, when the terminal station 3 is installed, the setting unit 32 receives the setting of the environment information by an input device, which is not illustrated, included in the terminal station 3. In addition, for example, the terminal station 3 may receive an update of the environment information from a management device, which is not illustrated. For example, the management device may monitor a communication environment such as a congestion status and a communication frequency of communication between the mobile relay station 2 and the terminal station 3 for each area, update the environment information of each terminal station 3 when the communication environment changes, and transmit the updated environment information to each terminal station 3. In addition, for example, the setting unit 32 receives an update of the relational data stored in the terminal station 3 by a management device, which is not illustrated. The environment information set in the setting unit 32 varies depending on the installation environment of the terminal station 3. Installation information different from that of another terminal station 3 is set in at least one of the plurality of terminal stations 3 included in the wireless communication system 1. On the other hand, the relational data set in the setting unit 32 is the same data in all the terminal stations 3 included in the wireless communication system 1.

The setting unit 32 causes the data storage unit 31 to store the value of the environment information and the relational data received from the outside. Note that, in a case where the installation environment of the terminal station 3 is subsequently changed due to the relocation of the terminal station 3 or the like, the environment information is reset by the user.

The acquisition unit 33 acquires the value of the environment information from the data storage unit 31. The condition specifying unit 34 refers to the relational data stored in the data storage unit 31 and specifies the transmission scheme associated with the value of the environment information acquired by the acquisition unit 33. In addition, the condition specifying unit 34 specifies the transmission time zone of the terminal uplink signal and the elevation angle of the LEO satellite for each time in the transmission time zone on the basis of the orbit information of the LEO satellite stored in the data storage unit 31.

The correction unit 35 corrects the transmission scheme specified by the condition specifying unit 34 on the basis of the elevation angle. The lower the elevation angle, the lower the separation performance of the terminal uplink signal in the mobile relay station 2. Accordingly, the correction unit 35 corrects the transmission scheme so that the lower the elevation angle, the higher the transmission quality. For example, in a case where the elevation angle is lower than a predetermined value, the correction unit 35 reduces the number of units of the multi-value number and increases the number of units of the number of bits of an error correction code. On the other hand, in a case where the elevation angle is higher than a predetermined value, the correction unit 35 increases the number of units of the multi-value number and reduces the number of units of the number of bits of an error correction code. In addition, the lower the elevation angle, the higher the SN ratio because the distance between the mobile relay station 2 and the terminal station 3 is longer. Accordingly, the correction unit 35 corrects the transmission scheme so that the lower the elevation angle, the larger the transmission power. For example, the correction unit 35 corrects the transmission power by multiplying the transmission power specified by the condition specifying unit 34 by a coefficient that increases as the elevation angle decreases.

The transmission unit 36 wirelessly transmits, from the antenna 37, the terminal uplink signal in which the sensor data stored in the data storage unit 31 is set as terminal transmission data according to the transmission time zone specified and the transmission scheme corrected by the correction unit 35. The transmission unit 36 may give notification of the transmission scheme of the terminal uplink signal using a preamble. The transmission unit 36 transmits the signal by, for example, low power wide area (LPWA). Examples of the LPWA include LoRaWAN (registered trademark), Sigfox (registered trademark), long term evolution for machines (LTE-M), and narrow band (NB)-IoT, but any wireless communication scheme can be used. In addition, the transmission unit 36 may perform transmission with another terminal station 3 by time-division multiplexing, orthogonal frequency division multiplexing (OFDM), MIMO, or the like. The transmission unit 36 determines a channel to be used by the own station to transmit the terminal uplink signal and a transmission timing by a method determined in advance in a wireless communication scheme to be used. In addition, the transmission unit 36 may perform beam formation of the signals to be transmitted from the plurality of antennas 37 by a method determined in advance in the wireless communication scheme to be used.

The base station 4 includes a plurality of antenna stations 41, a MIMO reception unit 42, a base station signal reception processing unit 43, and a terminal signal reception processing unit 44.

Each antenna station 41 is arranged at a position far from another antenna station 41 so as to increase a difference in an angle of arrival of a signal from each of the plurality of second antennas 24 of the mobile relay station 2. Each antenna station 41 converts a base station downlink signal received from the mobile relay station 2 into an electric signal and outputs the electric signal to the MIMO reception unit 42.

The MIMO reception unit 42 aggregates the base station downlink signals received from the plurality of antenna stations 41. The MIMO reception unit 42 stores a weight for each reception time with respect to the base station downlink signal received by each antenna station 41 on the basis of the orbit data of the LEO satellite and the position of each antenna station 41. For example, the reception time may be indicated by a time elapsed from a reception start timing. The MIMO reception unit 42 multiplies the base station downlink signal input from each antenna station 41 by the weight corresponding to the reception time of the base station downlink signal and combines the reception signals multiplied by the weights. Note that the same weight may be used regardless of the reception time. The base station signal reception processing unit 43 demodulates and decodes the combined reception signal, thereby obtaining demodulation information. The base station signal reception processing unit 43 outputs the demodulation information to the terminal signal reception processing unit 44.

The terminal signal reception processing unit 44 performs reception processing of the terminal uplink signal. The terminal signal reception processing unit 44 decodes a symbol of the terminal uplink signal from the spectral data indicated by the demodulation information, thereby obtaining the terminal transmission data transmitted from the terminal station 3. That is, the terminal signal reception processing unit 44 decodes the symbol of the terminal uplink signal by converting the frequency domain waveform indicated by the spectral data into the time domain waveform.

Operation of the wireless communication system 1 will be described.

Figure 2:
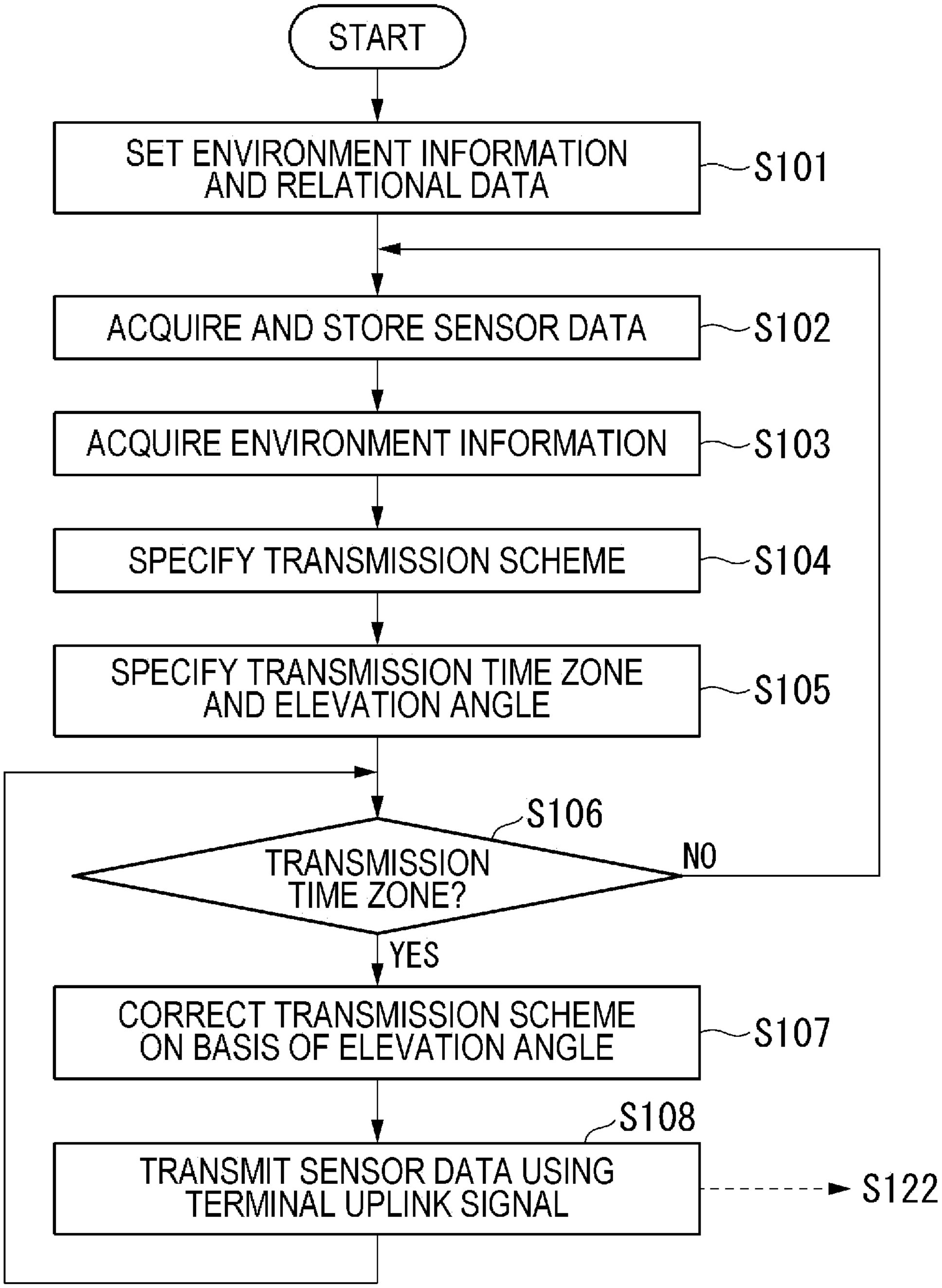
FIG. 2 is a flowchart illustrating processing of a terminal station according to the first embodiment.

FIG. 2 is a flowchart illustrating processing of the terminal station 3 according to the first embodiment. The setting unit 32 of the terminal station 3 receives input of environment information indicating the installation environment of the terminal station 3 and relational data at the time of installation (step S101). The setting unit 32 causes the data storage unit 31 to store the environment information and the relational data.

The terminal station 3 acquires data detected by a sensor, which is not illustrated, provided outside or inside and writes the acquired data to the data storage unit 31 (step S102). The acquisition unit 33 acquires the environment information from the data storage unit 31 (step S103). The condition specifying unit 34 specifies the transmission scheme (multi-value number, the number of bits of error correction code, and transmission power) associated with the value of the environment information acquired in step S103 from the relational data stored in the data storage unit 31 (step S104). In addition, the condition specifying unit 34 specifies the transmission time zone of the terminal uplink signal and the elevation angle of the LEO satellite in each time in the transmission time zone on the basis of the orbit data of the LEO satellite stored in the data storage unit 31 (step S105).

The transmission unit 36 of the terminal station determines whether the current time is included in the transmission time zone of the uplink signal specified by the condition specifying unit 34 (step S106). When the transmission unit 36 determines that the current time is not included in the transmission time zone of the uplink signal (step S106: NO), the terminal station 3 returns the processing to step S101.

On the other hand, when the transmission unit 36 determines that the current time is included in the transmission time zone of the uplink signal (step S106: YES), the correction unit 35 corrects the transmission scheme on the basis of the elevation angle of the LEO satellite at the current time such that the lower the elevation angle, the higher the transmission quality, and the larger the transmission power (step S107). The transmission unit 36 reads the sensor data from the data storage unit 31, sets the read sensor data as terminal transmission data, and sets the terminal transmission data in the terminal uplink signal of the transmission scheme corrected in step S107. The transmission unit 36 wirelessly transmits the terminal uplink signal in which the terminal transmission data is set through the antenna 37 (step S108). The terminal station 3 returns the processing to step S106. As a result, the terminal station 3 continuously transmits the uplink signal during the transmission time zone.

Figure 3:
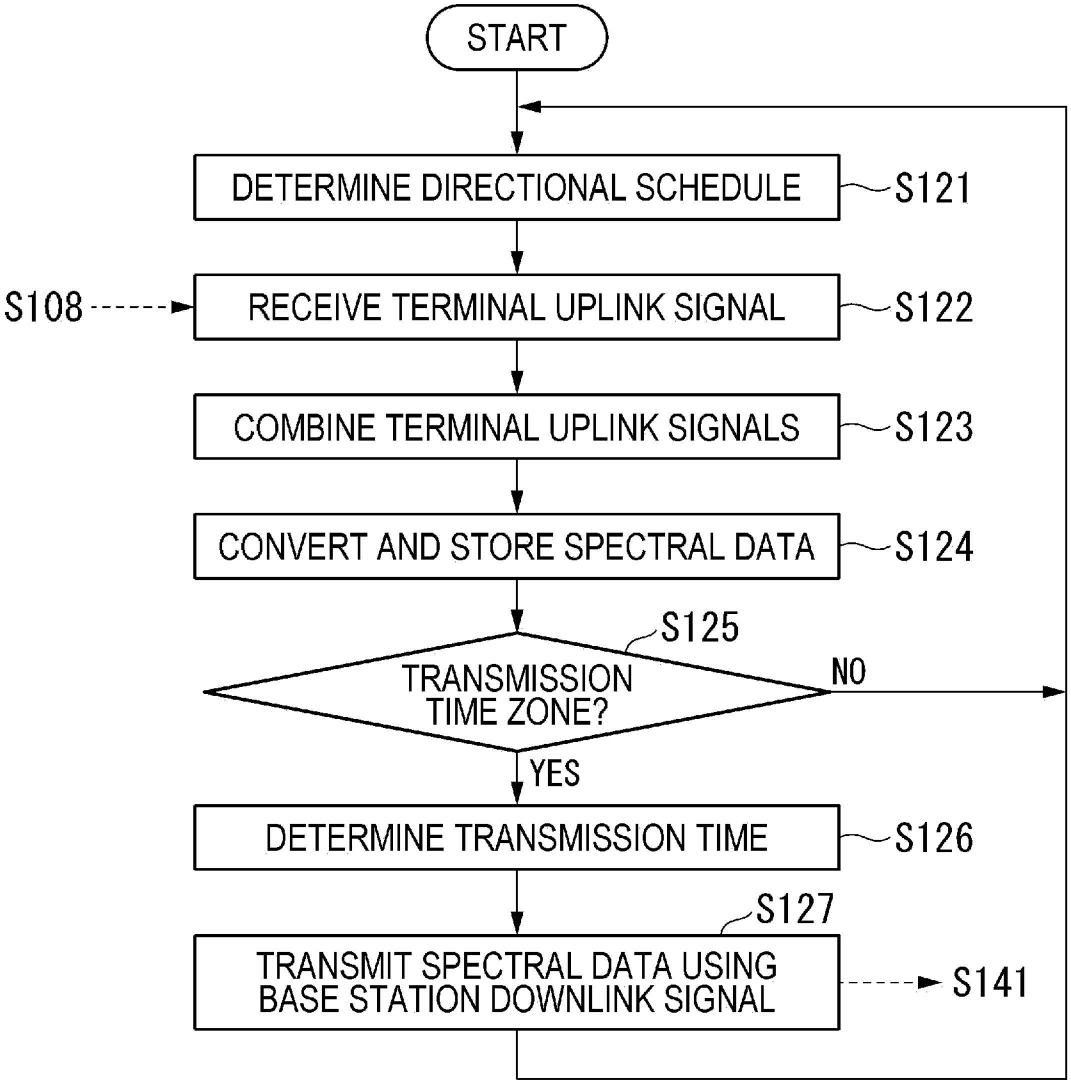
FIG. 3 is a flowchart illustrating processing of a mobile relay station according to the first embodiment.

FIG. 3 is a flowchart illustrating processing of the mobile relay station 2 according to the first embodiment. The reception schedule determination unit 222 of the mobile relay station 2 determines, for each time, the terminal station 3 from which the terminal uplink signal is to be received on the basis of the position data of the terminal station 3 and the orbit data stored in the storage unit 221 (step S121). The plurality of reception units 223 receives the terminal uplink signal transmitted from the terminal station 3 (step S122). Depending on the wireless communication schemes of the transmission source terminal stations 3 serving as transmission sources, there are some cases where a terminal uplink signal is received from only one terminal station 3 by time division at the same frequency, or there are some cases where the terminal uplink signals are simultaneously received from a plurality of terminal stations 3 at the same frequency. The combining unit 224 combines the terminal uplink signals received by the plurality of reception units 223 according to a predetermined combination parameter (step S123). The spectrum conversion unit 225 converts the signal combined by the combining unit 224 into spectral data and records the spectral data in the storage unit 221 (step 124).

The transmission schedule determination unit 232 determines whether the current time is included in the communication time zone with the base station 4 by referring to the storage unit 231 (step S125). When the current time is not included in the communication time zone with the base station 4 (step S125: NO), the processing returns to step S121. On the other hand, when the current time is included in the communication time zone with the base station 4 (step S125: YES), the transmission schedule determination unit 232 determines a transmission time of each spectral data on the basis of the number of pieces of the spectral data stored in the storage unit 221 and the length of the communication time zone with the base station 4 (step S126).

The data generation unit 235 performs parallel conversion on the spectral data stored in the storage unit 221, and the transmission data modulation unit 236 modulates the parallel-converted spectral data. The MIMO communication unit 234 weights the transmission data modulated by the transmission data modulation unit 236 with the weight issued from the control unit 233 and generates a base station downlink signal to be transmitted from each second antenna 24. The MIMO communication unit 234 transmits each generated base station downlink signal from the second antenna 24 by MIMO (step S127). When transmitting all the spectral data stored in the storage unit 221, the mobile relay station 2 returns the processing to step S121.

Figure 4:
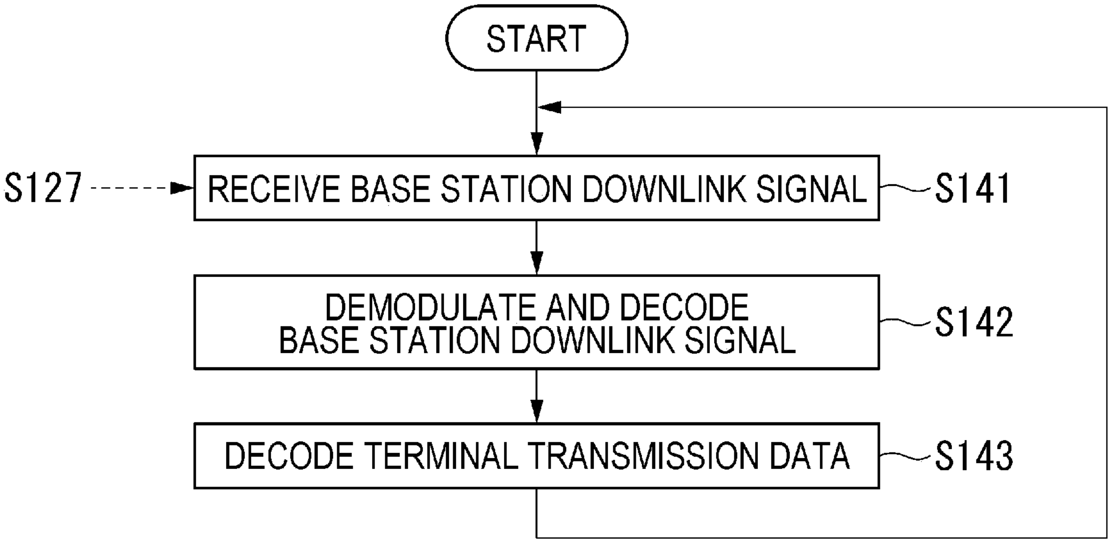
FIG. 4 is a flowchart illustrating processing of a base station according to the first embodiment.

FIG. 4 is a flowchart illustrating processing of the base station 4 according to the first embodiment. Each antenna station 41 of the base station 4 receives the base station downlink signal from the mobile relay station 2 (step S141). Each antenna station 41 outputs, to the MIMO reception unit 42, a reception signal obtained by converting the received base station downlink signal into an electric signal. The MIMO reception unit 42 synchronizes timings of the reception signals received from the antenna stations 41. The MIMO reception unit 42 combines the reception signals received by the antenna stations 41 on the basis of the weights. The base station signal reception processing unit 43 demodulates the combined reception signal (step S142). The base station signal reception processing unit 43 outputs the spectral data obtained by decoding the demodulated reception signal to the terminal signal reception processing unit 44.

The terminal signal reception processing unit 44 decodes a symbol of the terminal uplink signal indicated by the spectral data, thereby obtaining the terminal transmission data transmitted from the terminal station 3 (step S143). Note that the terminal signal reception processing unit 44 can also use a decoding method having a large calculation load, such as successive interference cancellation (SIC). The base station 4 repeats the processing from step S141.

As described above, according to the first embodiment, the terminal station 3 specifies the transmission scheme of the data to the mobile relay station 2 on the basis of the relational data indicating the relationship between the environment information and the transmission scheme and the environment information indicating the installation environment of the terminal station 3. As a result, the terminal station 3 can improve the communication efficiency according to the environment in which the terminal station 3 is installed by setting an appropriate transmission scheme for each installation environment as the relational data.

In addition, according to the first embodiment, the terminal station 3 corrects the specified transmission scheme on the basis of the orbit information of the mobile relay station 2. Since the magnitude of the channel capacity of the terminal station 3 and the mobile relay station 2 can be predicted from the orbit information of the mobile relay station 2, the terminal station 3 can further improve the communication efficiency by correcting the transmission scheme on the basis of the orbit information. Note that, in another embodiment, the terminal station 3 may communicate with the mobile relay station 2 without correcting the specified transmission scheme.

Second Embodiment

Figure 5:
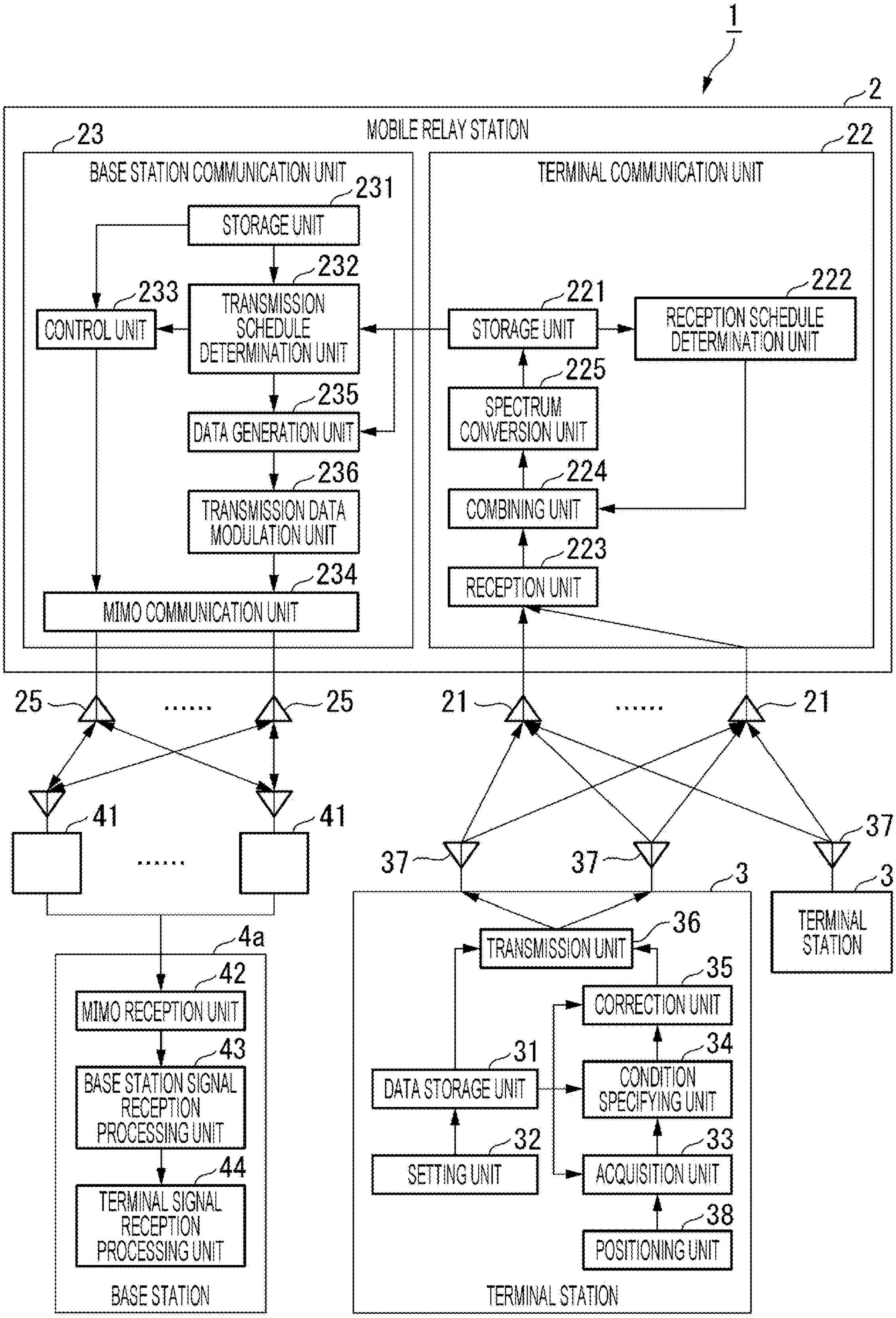
FIG. 5 is a configuration diagram of a wireless communication system according to a second embodiment.

FIG. 5 is a configuration diagram of a wireless communication system 1 according to a second embodiment. The terminal station 3 according to the first embodiment determines the transmission scheme on the basis of the environment information set at the time of installation. On the other hand, a terminal station 3 according to the second embodiment acquires the environment information on the basis of the position of the own station measured by a global navigation satellite system (GNSS) or the like. In this case, it is not necessary to reset the environment information even when the installation environment changes due to relocation or the like.

The terminal station 3 according to the second embodiment further includes a positioning unit (hereinafter also referred to as "positioner") 38 in addition to the configuration of the first embodiment. In addition, in the second embodiment, information stored in a data storage unit 31 and processing of an acquisition unit 33 included in the terminal station 3 are different from those of the first embodiment. The positioning unit 38 specifies the position of the terminal station 3 on the ground with the GNSS.

The data storage unit 31 according to the second embodiment stores map information indicating the relationship between the position on the ground and the value of the environment information instead of the setting information of the first embodiment. The map information is data in which an area indicated by a combination of latitude and longitude is associated with a value of environment information of the area. The setting unit 32 may receive an update of the map information. The acquisition unit 33 acquires the value of the environment information associated with the position of the terminal station 3 measured by the positioning unit 38 from the map information.

As described above, the terminal station 3 according to the second embodiment acquires the environment information on the basis of the map information indicating the relationship between the position on the ground and the environment information and the measured position of the own station. As a result, the terminal station 3 can adapt to the change in the installation environment without resetting the environment information.

Third Embodiment

Figure 6:
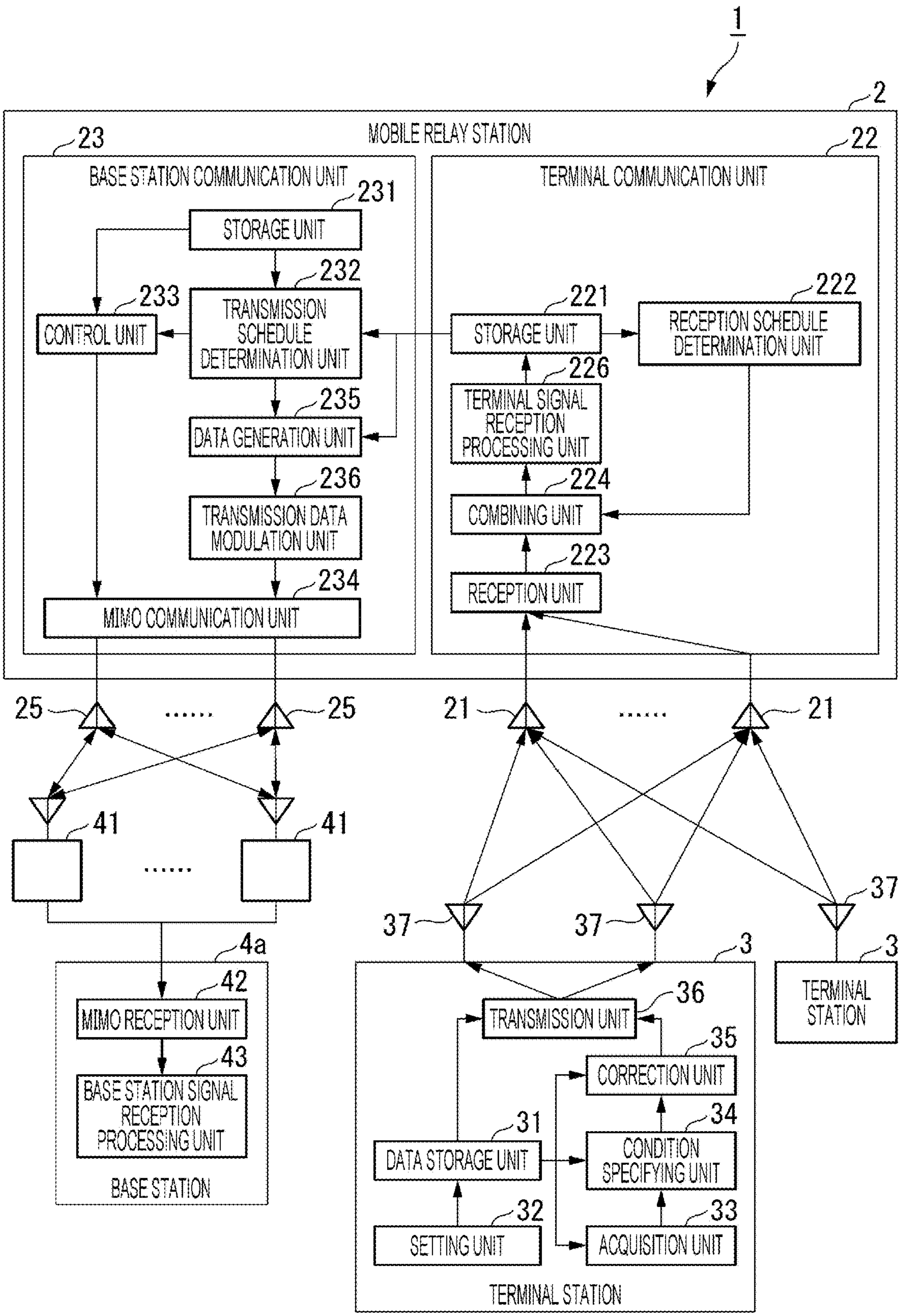
FIG. 6 is a configuration diagram of a wireless communication system according to a third embodiment.

FIG. 6 is a configuration diagram of a wireless communication system 1 according to a third embodiment. The mobile relay stations 2 according to the first and second embodiments transmit spectral data of the terminal uplink signal received from the terminal station 3 to the base station 4 using the base station downlink signal. On the other hand, a mobile relay station 2 according to the third embodiment reads sensor data from a terminal uplink signal received from a terminal station 3, and transmits the read sensor data to a base station 4 using a base station downlink signal.

The terminal communication unit 22 of the mobile relay station 2 according to the third embodiment includes a terminal signal reception processing unit 226 instead of the spectrum conversion unit 225 of the first embodiment. Similarly to the terminal signal reception processing unit 44 of the first embodiment, the terminal signal reception processing unit 226 decodes a symbol of the terminal uplink signal and obtains sensor data transmitted from the terminal station 3. The terminal signal reception processing unit 226 reads the transmission scheme from the preamble of the terminal uplink signal transmitted from the terminal station 3, and decodes the terminal uplink signal on the basis of the transmission scheme. The storage unit 221 according to the third embodiment stores the sensor data received by the terminal signal reception processing unit 226. The data generation unit 235 of the base station communication unit 23 converts the sensor data into a parallel signal.

Since the sensor data decoded from the terminal uplink signal is superimposed on the base station downlink signal transmitted by the mobile relay station 2, the base station signal reception processing unit 43 of the base station 4 can obtain the sensor data by decoding the base station downlink signal. Thus, the base station 4 according to the third embodiment may not include the terminal signal reception processing unit 44.

As described above, according to the above-described embodiments, the terminal station 3 acquires the environment information indicating the installation environment of the own station, and specifies the data transmission scheme on the basis of the relational data indicating the relationship between the environment information and the transmission scheme and the acquired environment information. As a result, the terminal station 3 can improve the communication efficiency according to the installation environment.

The terminal station 3 includes a processor, a memory, an auxiliary storage device, and the like connected by a bus and executes a program to function as a device including the acquisition unit 33 and the condition specifying unit 34. Examples of the processor include a central processing unit (CPU), a graphic processing unit (GPU), and a microprocessor.

The program may be recorded on a computer-readable recording medium. The computer-readable recording medium is a storage device such as a magnetic disk, a magneto-optical disk, an optical disk, or a semiconductor memory, for example. A relay program may be transmitted via an electrical communication line.

Note that all or some of the functions of the terminal station 3 may be implemented by using a custom large scale integrated circuit (LSI) such as an application specific integrated circuit (ASIC) or a programmable logic device (PLD). Examples of the PLD include a programmable array logic (PAL), a generic array logic (GAL), a complex programmable logic device (CPLD), and a field programmable gate array (FPGA). Such an integrated circuit is also included in the examples of the processor.

Other Embodiments

Although embodiments have been described in detail with reference to the drawings, specific configurations are not limited to the above-described configurations, and various design changes and the like can be made thereto. That is, in other embodiments, the order of the above-described processing may be changed as appropriate. In addition, part of the processing may be executed in parallel.

The terminal station 3 according to the above-described embodiments may be formed with a single computer, or the components of the terminal station 3 may be disposed to be divided into a plurality of computers, and the plurality of computers may function as the terminal station 3 in cooperation with each other.

According to the above-described embodiments, the multi-value number, the error correction code, and the transmission power are changed according to the environment information of the terminal station 3, but it is not limited thereto. For example, in other embodiments, at least one of the multi-value number, the error correction code, and the transmission power may be changed according to the environment information. In addition, in other embodiments, the transmission scheme other than the multi-value number, the error correction code, and the transmission power may be different.

In the above-described embodiments, the mobile relay station 2 is mounted on the LEO satellite, but it is not limited thereto. For example, the mobile relay station 2 according to other embodiments may be mounted on another flying object such as a geostationary satellite, a drone, or a HAPS. In addition, in the above-described embodiments, the mobile relay station 2 moves above the earth, and the terminal station 3 and the base station 4 are provided on the earth, but the wireless communication system 1 according to other embodiments may use a celestial body other than the earth, such as the moon.

REFERENCE SIGNS LIST

1 Wireless communication system
2 Mobile relay station
21 First antenna
22 Terminal communication unit
221 Storage unit
222 Reception schedule determination unit
223 Reception unit
224 Combining unit
225 Spectrum conversion unit
226 Terminal signal reception processing unit
23 Base station communication unit
231 Storage unit
232 Transmission schedule determination unit
233 Control unit
234 MIMO communication unit
235 Data generation unit
236 Transmission data modulation unit
24 Second antenna
3 Terminal station
31 Data storage unit
32 Setting unit

33 Acquisition unit
34 Condition specifying unit
35 Correction unit
36 Transmission unit
37 Antenna
38 Positioning unit
4 Base station
41 Antenna station
42 MIMO reception unit
43 Base station signal reception processing unit
44 Terminal signal reception processing unit

The invention claimed is:

1. A communication apparatus that transmits data to a relay device that performs communication while moving, the communication apparatus comprising:

an acquirer that acquires environment information indicating an installation environment of the communication apparatus;

a scheme specifier that specifies a transmission scheme of the data on a basis of relational data indicating a relationship between the environment information and the transmission scheme and the acquired environment information; and a transmitter that transmits the data to the relay device on a basis of the specified transmission scheme.

2. The communication apparatus according to claim 1, comprising:

a corrector that corrects the specified transmission scheme on a basis of orbit information indicating an orbit of the relay device, wherein the transmitter transmits the data to the relay device on a basis of the corrected transmission scheme.

3. The communication apparatus according to claim 1, comprising:

a positioner that measures a position of the communication apparatus, wherein the acquirer acquires the environment information on a basis of map information indicating a relationship between a position on ground and the environment information, and the measured position.

4. A communication system, comprising:

a relay device that performs communication while moving; and a plurality of communication apparatuses according to claim 1, wherein the environment information of at least one of the plurality of communication apparatuses is different from the environment information of another communication apparatus.

5. A communication method of a communication apparatus that transmits data to a relay device that performs communication while moving, the communication method comprising:

acquiring environment information indicating an installation environment of the communication apparatus;

specifying a transmission scheme of the data on a basis of relational data indicating a relationship between the environment information and the transmission scheme and the acquired environment information; and transmitting the data to the relay device on a basis of the specified transmission scheme.

6. A non-transitory storage medium that stores a program for causing a computer to execute processes as the communication apparatus, the processes comprising:

acquiring environment information indicating an installation environment of the communication apparatus;

specifying a transmission scheme of the data on a basis of relational data indicating a relationship between the environment information and the transmission scheme and the acquired environment information; and transmitting the data to the relay device on a basis of the specified transmission scheme.

* * * * *